United States Patent
Hasegawa et al.

(10) Patent No.: US 8,356,530 B2
(45) Date of Patent: Jan. 22, 2013

(54) PUSH-PULL CABLE

(75) Inventors: Yuichi Hasegawa, Nagoya (JP);
Yoshikatsu Tsuge, Nagoya (JP)

(73) Assignee: Chuo Hatsujo Kabushiki Kaisha, Nagoya-Shi (JP)

( * ) Notice: Subject to any disclaimer, the term of this patent is extended or adjusted under 35 U.S.C. 154(b) by 148 days.

(21) Appl. No.: 12/913,125

(22) Filed: Oct. 27, 2010

(65) Prior Publication Data

US 2011/0100151 A1    May 5, 2011

(30) Foreign Application Priority Data

Oct. 30, 2009   (JP) ................... 2009-249988

(51) Int. Cl.
*F16C 1/10*   (2006.01)

(52) U.S. Cl. ...................................... 74/500.5

(58) Field of Classification Search ................. 74/500.5, 74/501.5 R, 502.5; 428/35.8
See application file for complete search history.

(56) References Cited

U.S. PATENT DOCUMENTS

| | | | |
|---|---|---|---|
| 2,382,966 A * | 8/1945 | Arens ........................ | 74/502.5 |
| 2,689,399 A * | 9/1954 | Gray .......................... | 428/645 |
| 6,194,666 B1 | 2/2001 | Hayashida et al. | |
| 6,884,481 B1 * | 4/2005 | Reynolds et al. ........... | 428/35.7 |
| 7,162,858 B2 * | 1/2007 | Graham ...................... | 57/213 |
| 2001/0000854 A1 | 5/2001 | Uneme et al. | |
| 2006/0260288 A1 | 11/2006 | Graham | |

FOREIGN PATENT DOCUMENTS

JP    2006-342917 A    12/2006

* cited by examiner

*Primary Examiner* — Vickey Johnson
(74) *Attorney, Agent, or Firm* — J-Tek Law PLLC; Jeffrey D. Tekanic

(57) ABSTRACT

A push-pull cable suitable for automotive applications includes an outer cable having a hollow interior and an inner cable having a circular cross section perpendicular to its axial direction. The inner cable is slidably disposed within the hollow interior and grease is disposed in a clearance defined between an outer circumferential surface of the inner cable and an inner circumferential surface of the outer cable. The inner cable consists of a single metal wire coated with a metal plated layer, the plated layer has a thickness between 3 and 35 microns and the clearance is between 0.05 to 0.5 millimeters.

23 Claims, 2 Drawing Sheets

PUSH-PULL CABLE

CROSS-REFERENCE TO RELATED APPLICATION

This application claims priority to Japanese Patent Application No. 2009-249988 filed on Oct. 30, 2009, the contents of which are hereby incorporated by reference into the present application.

TECHNICAL FIELD

The present application generally relates to a push-pull cable suitable for automotive applications, such as a control cable for locking and unlocking an automobile door, a hinged gas cap cover/lid or an engine or trunk lid.

DESCRIPTION OF RELATED ART

A push-pull or control cable utilized for locking/unlocking operations is designed to transmit tensile and compressive forces/loads. Japanese Patent Application Publication No. 2006-342917 discloses a known lock cable that includes an inner cable slidably disposed within an outer cable. The inner cable consists of a single metal wire having a polygonal shape and the outer cable has a tubular shape. In this known lock cable, three or more axially-extending, projecting ridges extend outwardly from the outer circumference of the inner cable. The projecting ridges enable the inner cable to be supported within the outer cable in a balanced manner with reduced sliding friction between the inner cable and outer cable. Due to the projecting ridges, the tensile/compressive load transmitting efficiency of the control cable, and thus its durability, is alleged to be relatively high. A large sliding friction would undesirably reduce the tensile/compressive load transmitting efficiency of the control cable.

SUMMARY

In the known lock cable, the projecting ridges must be formed on the outer circumference of the inner cable of the lock cable. However, manufacturing an inner cable having three or more projecting ridges is more difficult than manufacturing an inner cable having a circular cross section. Therefore, it would be desirable to increase the durability of a push-pull cable using an inner cable having a circular cross section.

Thus, in one aspect of the present teachings, a push-pull cable having a circular inner cable is provided that is capable of maintaining a high tensile/compressive load transmitting efficiency for a relatively long period of time.

As will be understood, the terms "push-pull cable", "control cable" and "lock cable" are used in an interchangeable manner in the present description and are intended to generally concern a cable having an inner cable slidably disposed within an outer cable, regardless of the application thereof.

In the past, it has been attempted to increase the durability of the control cable by suitably selecting the grease or lubricant that is disposed in a clearance between the inner cable and the outer cable. For example, the durability of the control cable has been improved by utilizing a grease that strongly adheres or clings to the inner cable and the outer cable. However, a portion of the grease will typically evaporate over time. If the evaporated grease condenses and adheres to a surface of an electrical component in the automobile, a short circuit or other circuit/component malfunction may result. Consequently, if it is desired to change the grease, a variety of costly and time-consuming tests, such as endurance tests and/or environmental tests, must be conducted with the new grease in order to ensure that it will not cause undesired problems. Therefore, it would be advantageous to improve the durability of a push-pull cable by a technique other than changing the grease.

As a result of studies concerning the reduction of load transmitting efficiency over time, the present inventors discovered that a metal plated layer disposed on the outer surface of the inner cable exfoliates over a long period of time due to repeated sliding contact between the inner cable and the outer cable, which sliding contact is slightly abrasive. When the exfoliated metal pieces or chips mix with the grease, the sliding friction between the inner cable and the outer cable increases. The present inventors determined that this exfoliation of the metal plated layer from the inner cable can be effectively reduced by appropriately selecting the thickness of the metal plated layer and/or the clearance between the outer circumferential surface of the inner cable and the inner circumferential surface of the outer cable.

In another aspect of the present teachings, a push-pull cable suitable for automotive applications comprises an inner cable slidably disposed within an outer cable. The inner cable comprises a single metal wire coated with a metal plated layer and has a circular cross section in a plane perpendicular to the axial direction of the inner cable. Grease is disposed in a clearance between the inner cable and the outer cable. The thickness of the metal plated layer is preferably between 3 and 35 microns and the clearance between the outer circumferential surface of the inner cable and the inner circumferential surface of the outer cable is preferably between 0.05 to 0.5 millimeters. Preferably, no other wire or solid structure, such as a plurality of twisted strands disposed around the inner cable, intervenes between the outer circumferential surface of the inner cable and the inner circumferential surface of the outer cable. As such, the outer circumferential surface (i.e. the metal plating) of the inner cable can directly contact the inner circumferential surface of the outer cable, e.g., when the push-pull cable is bent or curved. That is, the push-pull cable may be preferably designed such that the circular-shaped metal plated layer is capable of making direct sliding contact with the inner circumferential surface of the outer cable.

In another aspect of the present teachings, the clearance between the outer circumferential surface of the inner cable and the inner circumferential surface of the outer cable is greater than in known automobile door lock cables. In addition or in the alternative, the thickness of the metal plated layer disposed on the inner cable is preferably thinner than in known door lock cables. More advantageously, the combination of a relatively large clearance and a relatively thin metal plated layer can effectively prevent the metal plated layer from exfoliating from the outer circumferential surface of inner cable in a detrimental manner, thereby increasing the durability of the push-pull cable.

DETAILED DESCRIPTION OF A PREFERRED EMBODIMENT

A representative example of the present teachings will now be explained with reference to the drawings, which involves an automobile door lock cable 10, i.e. a cable designed to transmit tensile and compressive forces to an automobile door lock. However, it is understood that push-pull or control cables according to the present teachings are not limited to automobile door lock applications and may be utilized in any other suitable manner.

Figure 1:
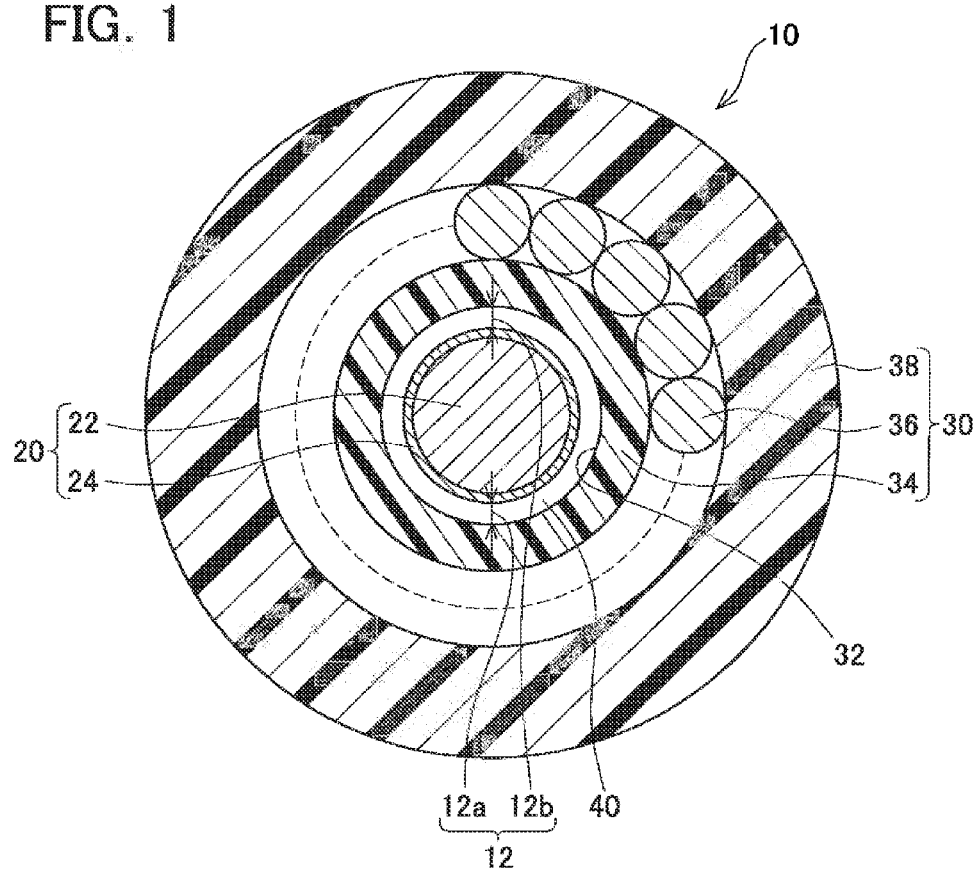
FIG. 1 shows a cross section of a representative push-pull cable according to the present teachings.

Referring to FIG. 1, the representative door lock cable 10 comprises an inner cable 20 and an outer cable 30. The inner cable 20 consists of a single metallic wire 22 having a metallic plated layer 24 is disposed on the outer surface thereof. The inner cable 20 has a circular or cylindrical cross section in a plane that is perpendicular to the axial direction of the inner cable 20. The metallic wire 22 is preferably a steel wire having a diameter of preferably between about 1.15 and 1.25 mm, although other metals may be advantageously utilized depending upon the application. By setting the diameter of the metal wire 22, e.g., within the range of 1.15 to 1.25 mm, the door lock cable 10 is capable of transmitting tensile and compressive loads of a magnitude that is necessary, e.g., for locking and unlocking an automobile door lock, a gas cap lid and/or a trunk lid. The plated layer 24 may be formed as a metal plating or film having a small sliding resistance, as will be further discussed below. The plated layer 24 may be, for example, a zinc plating, a zinc alloy plating or a zinc-aluminum plating. By forming the plated layer 24 on the outer surface of the metal wire 22, the surface of the inner cable 20 can be made relatively smooth.

The outer cable 30 comprises a polyethylene liner 34, a shield layer comprising a plurality of metallic wires 36 disposed around the outer circumferential surface of the liner 34 without any spacing therebetween, and a polypropylene covering layer 38 that covers the shield layer. The liner 34 is tubular (i.e. it has a circular or cylindrical hollow interior) and the inner cable 20 is slidably disposed in a through-hole 32 defined in the center thereof. The inner diameter of the liner 34 is preferably between about 1.30 and 1.65 mm. By setting the inner diameter of the liner 34 to be 1.30 mm or more, a sufficient clearance between the outer cable 30 and the inner cable 20 is provided. Moreover, by setting the inner diameter of the liner 34 to be 1.65 mm or less, the wire routing of the door lock cable 10 to the automobile door interior can be performed easily. The metallic wires 36 are preferably hard steel wires having a diameter of 0.5 mm. By setting the diameter of the metallic wires 36 to be about 0.5 mm, it is possible to ensure an adequate amount of flexibility that is typically required in a door lock cable, as well as to sufficiently protect the inner cable 20 from forces that are applied from the outside. Metallic wires 36 omitted for purposes of clarity in FIG. 1 are indicated with a dotted line. Preferably, the shield layer comprises fifteen or sixteen metallic wires 36 in this embodiment and the wires 36 are twisted around the outer circumferential surface of the liner 34 without any spacing therebetween. A clearance 12 is defined between the outer circumferential surface of the inner cable 20 (i.e. the metal plated layer 24) and the inner circumferential surface of the outer cable 30 (i.e. the liner 34). Silicone grease 40 is disposed in the clearance 12, which reduces the sliding resistance between the inner cable 20 and the outer cable 30 in the door lock cable 10.

In this embodiment, the thickness of the plated layer (metal film) 24 is preferably between about 3 and 35 μm. By setting the thickness of the plated layer 24 to be 3 μm or more, it is possible to reliably prevent the plated layer 24 disposed on the surface of the metal wire 22 from being scraped off (i.e. from exfoliating) during operation such that the metal wire 22 becomes exposed. Consequently, a plated layer 24 of 3 μm or more decreases the likelihood of the bare metal wire 22 of the inner cable 20 from coming into contact with the outer cable 30 for a relatively long period of time, thereby preventing the sliding resistance of the door lock cable 10 from increasing over the service life of the door lock cable 10.

Moreover, by setting the thickness of the plated layer 24 to be 35 μm or less, it is possible to reduce the amount of the plated layer 24 that exfoliates from the inner cable 20 over the service life of the door lock cable 10. Consequently, it is possible to reduce the likelihood of material exfoliated from the plated layer 24 from mixing with the silicone grease 40 for a relatively long period of time, which would cause the sliding resistance between the inner cable 20 and the outer cable 30 to increase.

Further, in this embodiment, the clearance 12 between the inner cable 20 and the outer cable 30 is preferably between about 0.05 and 0.5 mm. By setting the clearance 12 to be 0.05 mm or more, the slidability of the inner cable 20 relative to the outer cable 30 will improve and the sliding resistance between the inner cable 20 and the outer cable 30 can be reduced. The width of the clearance 12 is set to be 0.5 mm or less for the following reason. If the clearance 12 is greater than 0.5 mm, the outer diameter of the door lock cable 10 will be increased, which increased diameter will make the wire routing of the door lock cable 10 more difficult. Further, the aforementioned configuration is employed in order to suppress an increase of stroke loss during the push/pull operation of the door lock cable 10.

According to the teachings of this embodiment, a highly durable door lock cable 10 may be realized by setting the thickness of the plated layer 24 of the inner cable 20 to be 3 to 35 μm and by setting the clearance 12 between the inner cable 20 and the outer cable 30 to be 0.05 to 0.5 mm. Consequently, when the door lock cable 10 of this embodiment is used in an automobile, a satisfactory load transmitting efficiency, which is typically required for a door lock cable, can be maintained for a relatively long period of time. As a result, it normally should not be necessary to replace the door lock cable 10 within a typical service life of the automobile.

Exemplary door lock cables according to the above-described teachings, as well as door lock cables serving as comparative examples were prepared and subjected to a variety of tests, as will now be further described in the following.

(Test 1)

First, a plurality of door lock cables were prepared with clearance widths that varied within the range of 0.02 to 0.5 mm, and the sliding resistance R(N) of the respective door lock cables was measured. In the door lock cables used in this test, the outer diameter of the inner cable 20 was between 1.15 and 1.25 mm and the inner diameter of the liner 34 was between 1.30 and 1.65 mm. Zinc plating was used as the plated layer 24 and the thickness of the plated layer 24 was 18 μm. Silicone grease was filled into the clearance 12 between the inner cable 20 and the outer cable 30. For the purpose of measuring the sliding resistance R, the door lock cable was actually wire-routed to an automobile door, one end assumed a no-load state and the tensile force M required to pull the other end of the door lock cable in the no-load state in the axial direction of the door lock cable was measured. The sliding resistance R was derived from the measured tensile force M (i.e. R=M).

Figure 2:
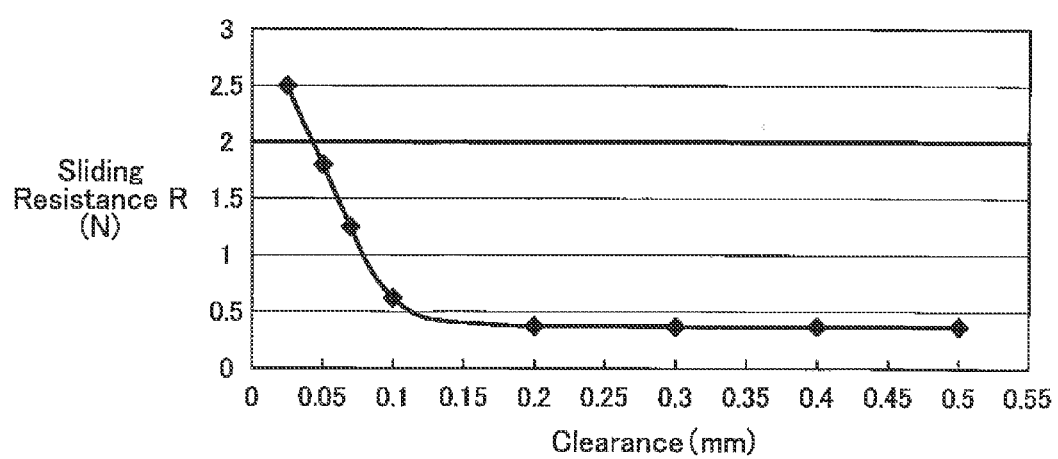
FIG. 2 shows the relationship between frictional force and the width of a clearance between the inner cable and the outer cable.

FIG. 2 shows the measurement results of the sliding resistance R of the various door lock cables. As is evident from these measurement results, door lock cables having a clearance 12 of 0.1 mm or more exhibited a sliding resistance R of approximately 0.5 N, and the sliding resistance R barely changed even if the width of the clearance 12 was further increased. On the other hand, door lock cables having a clearance of less than 0.1 mm exhibited a significant increase in the sliding resistance R in accordance with decreases in the width of the clearance 12. In particular, door lock cables having a clearance of less than 0.05 mm exhibited a sliding resistance R of 2 N or greater. Based on these sliding resistance (R) measurement results, it was established that, if the width of the clearance 12 is greater than or equal to 0.05 mm, the sliding resistance R can be reduced to less than 2 N. In this regard, it is noted that the numerical value "2N" represents the maximum sliding resistance that still permits the locking and unlocking the automobile door lock in a wide range of operating environments, including in low temperature environments.

(Test 2)

As was mentioned above, the above-described Test 1 established that the sliding resistance R will be approximately 2 N or less if the width of the clearance 12 between the outer circumferential surface of the inner cable 20 and inner circumferential surface of the outer cable 30 is 0.05 mm or more. Thus, in Test 2, a plurality of door lock cables were prepared by setting the clearance between the inner cable and the outer cable to be 0.05 mm, because this clearance is most susceptible to degradation in efficiency within the range of clearances that is able to reduce the sliding resistance to approximately 2 N or less. In addition, the plurality of door lock cables were provided with plated layers 24 having different thicknesses within the range of 1 to 54 μm, and an endurance test was performed on the respective door lock cables. In the door lock cables used in the endurance test, the outer diameter of the inner cable 20 was set to 1.25 mm (which includes the thickness of the plated layer 24), and the inner diameter of the liner 34 was set to 1.30 mm. Zinc plating was used as the plated layer and silicone grease was filled into the clearance 12 between the inner cable 20 and the outer cable 30.

Figure 3:
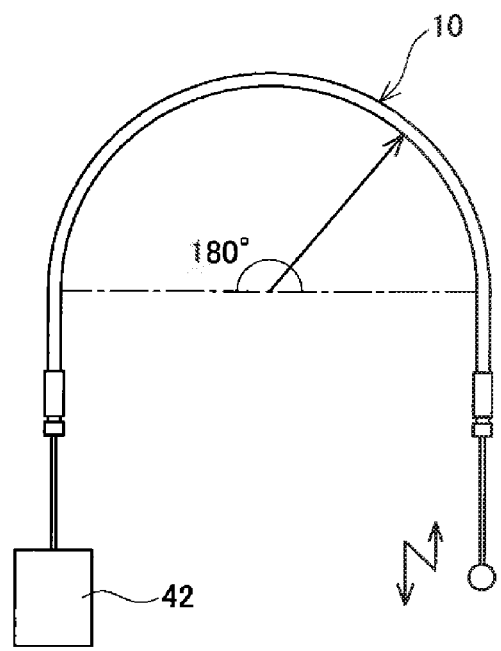
FIG. 3 illustrates a test set-up for determining the durability of the push-pull cable.

The method for performing the endurance test will now be explained with reference to the test set-up shown in FIG. 3. In this endurance test, a five kgf weight 42 was hung from one end of the door lock cable 10 (i.e. from one end of the inner cable 20) and the center portion of the door lock cable 10 was curved in a semicircle having a radius of 100 mm. In this state, the other end of the door lock cable 10 (i.e. the opposite end of the inner cable 20) was reciprocally moved 50,000 times along the routing direction of the door lock cable 10 with a reciprocating stroke length of 20 mm. After the door lock cable 10 was reciprocated 50,000 times in this endurance test, the amount of force F (kgf) required to raise the weight 42 using the door lock cable 10 was measured in order to obtain the load transmitting efficiency P (%). The load transmitting efficiency P is represented as P=100×(5/F) wherein the measured force F (kgf) is used to calculate P.

The numerical value "50,000 times" is a durability number, which represents the number of times that a door lock cable is expected to be used during a typical service life of an automobile. This durability number was calculated by assuming that the automobile is typically used three times a day and the automobile is locked and unlocked each time. Thus, the number of times that the automobile door is locked and unlocked each day is six times. Further, it is assumed that the automobile is used every day, such that the number of times that the door lock cable is used to lock/unlock the door in one year will be 365×6=2,190 times. Assuming that the service life of the automobile is ten years, the number of times that the door lock cable will be used during the service life of the automobile will be 2,190×10=21,900 times. As a safety factor, the numerical value 50,000 times (i.e. about twice the calculated number) was used as the number of reciprocations in the endurance test. Accordingly, if the load transmitting efficiency of the door lock cable does not considerably deteriorate during the service life of the automobile (i.e. after 50,000 reciprocal movements of the inner cable 20 relative to the outer cable 30), it is considered that it normally should not be necessary to replace the door lock cable during the service life of the automobile.

Figure 4:
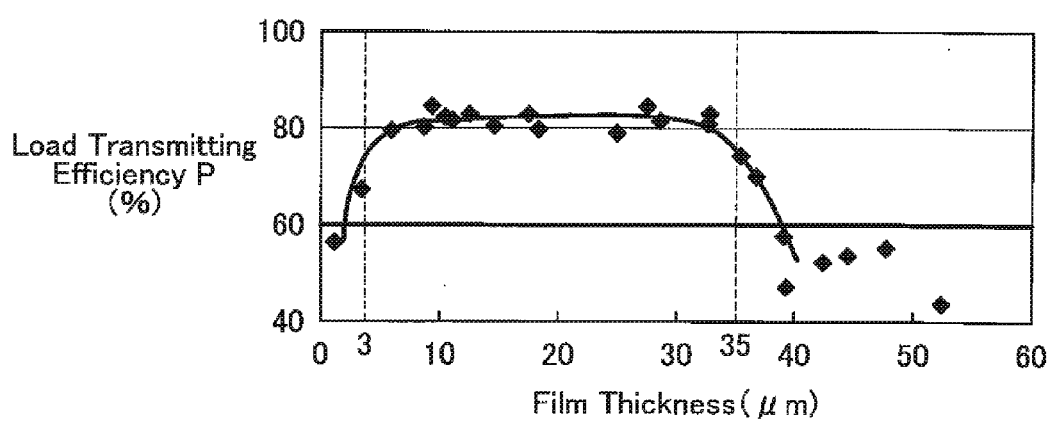
FIG. 4 illustrates the relationship between load transmitting efficiency and the thickness of a metal plated layer disposed on outer surface of the inner cable of the push-pull cable.

FIG. 4 shows the results of the endurance test using the door lock cables in which the width of the clearance 12 was 0.05 mm. As is evident from the measurement results, door lock cables having a clearance of 0.05 mm and a thickness of the plated layer 24 of the inner cable 20 between 10 to 30 μm exhibited a load transmitting efficiency P of 80% or higher after 50,000 reciprocal movements. On the other hand, door lock cables having a thickness of the plated layer 24 of the inner cable 30 that exceeded 30 μm exhibited a significant deterioration in the load transmitting efficiency P after 50,000 reciprocal movements. In particular, door lock cables having a plated layer thickness greater than 40 μm exhibited a load transmitting efficiency P of 60% or less. Similarly, door lock cables having a plated layer thickness less than 10 μm exhibited a significant deterioration in the load transmitting efficiency P as the thickness decreased. In particular, door lock cables having a plated layer thickness less than 1 μm exhibited a load transmitting efficiency P of 60% or less. Based on the results of the foregoing endurance test, it has been established that the load transmitting efficiency P after the endurance test can be maintained at 60% or more if the plated layer thickness is set within the range of 2 to 38 μm. However, due to manufacturing tolerances and/or variances, it is noted that the actual thickness of the plated layer could deviate by several microns from the intended value. Thus, in this embodiment, the range in which the load transmitting efficiency P can be reliably maintained at 60% or more was set to be 3 to 35 μm. The numerical value "60%" as the load transmitting efficiency P is a standard value that is considered to be the minimum required for reliably locking and unlocking the automobile door using the door lock cable. More specifically, if the load transmitting efficiency P of the door lock cable is the standard value or higher, the automobile can be designed so that the automobile door can be reliably locked and unlocked using the door lock cable. If the load transmitting efficiency P is the standard value or higher throughout the entire service life of the automobile, the automobile door can be reliably locked and unlocked using the same door lock cable over the entire service life of the automobile.

As was explained above, with the door lock cable 10 of this embodiment, it has been established that a highly durable door lock cable 10 can be realized by setting the clearance 12 between the inner cable 20 and the outer cable 30 to be 0.05 to 0.5 mm and by setting the thickness of the plated layer 24 of the inner cable 20 to be 3 to 35 μm. As a result of testing such door lock cables 10, it has been established that a satisfactory load transmitting efficiency for the door lock cable 10 can be maintained for a relatively long time period, such that it should not be necessary to replace the door lock cable 10 during the normal service life of the automobile.

Representative, non-limiting examples of the present teachings were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved push-pull cables, e.g., for automobiles, as well as methods for manufacturing the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A push-pull cable for an automobile comprising:
   an outer cable having a hollow interior,
   an inner cable having a circular cross section perpendicular to its axial direction, the inner cable being slidably disposed within the hollow interior, and
   grease disposed in a clearance defined between an outer circumferential surface of the inner cable and an inner circumferential surface of the outer cable,
   wherein the inner cable consists of a single metal wire coated with a metal plated layer, the plated layer has a thickness between 3 and 35 microns and the clearance is between 0.05 to 0.5 millimeters.

2. The push-pull cable as in claim 1, wherein the inner cable has an outer diameter between 1.15 and 1.25 millimeters.

3. The push-pull cable as in claim 2, wherein the thickness of the metal plated layer is between 10 and 30 microns.

4. The push-pull cable as in claim 3, wherein the metal plated layer is selected from the group consisting of a zinc plated layer and a zinc-aluminum plated layer.

5. The push-pull cable as in claim 4, wherein:
   the outer cable comprises a liner defining the hollow interior, a shield layer disposed around an outer circumferential surface of the liner and a covering layer surrounding the shield layer, and
   the hollow interior has an inner diameter between 1.30 and 1.65 millimeters.

6. The push-pull cable as in claim 5, wherein the clearance defined between the inner cable and the outer cable is between 0.1 and 0.5 millimeters.

7. The push-pull cable as in claim 6, wherein the grease is silicone grease.

8. The push-pull cable as in claim 1, wherein the metal plated layer is selected from the group consisting of a zinc plated layer and a zinc-aluminum plated layer.

9. The push-pull cable as in claim 8, wherein the inner cable has an outer diameter between 1.15 and 1.25 millimeters.

10. The push-pull cable as in claim 9, wherein the grease is silicone grease.

11. The push-pull cable as in claim 1, wherein:
    the inner cable has a diameter between 1.15 and 1.25 millimeters,
    the outer cable comprises a liner defining the hollow interior, a shield layer disposed around an outer circumferential surface of the liner and a covering layer surrounding the shield layer, and
    the hollow interior has an inner diameter between 1.30 and 1.65 millimeters.

12. The push-pull cable as in claim 11, wherein the metal plated layer is selected from the group consisting of a zinc plated layer and a zinc-aluminum plated layer.

13. The push-pull cable as in claim 12, wherein the grease is silicone grease.

14. The push-pull cable as in claim 13, wherein the liner at least substantially comprises polyethylene.

15. The push-pull cable as in claim 1, wherein at least an inner cylindrical surface of the outer cable that defines the hollow interior at least substantially comprises polyethylene.

16. A push-pull cable comprising:
    an outer cable defining a cylindrical hollow interior having an inner diameter, and
    a cylindrical inner cable slidably disposed within the hollow interior, the inner cable having an outer diameter that is between 0.05 and 0.5 millimeters less than the inner diameter such that a clearance is defined between an outer circumferential surface of the inner cable and an inner circumferential surface of the outer cable,
    wherein the inner cable consists of an outer sheath consisting of a first metallic composition surrounding and directly contacting a core consisting of a second metallic composition, the outer sheath having a thickness of between 3 and 35 microns.

17. The push-pull cable as in claim 16, wherein the outer diameter is between about 1.15 and 1.25 millimeters and the inner diameter is between about 1.30 and 1.65 millimeters.

18. The push-pull cable as in claim 17, wherein the first metallic composition comprises one of zinc, a zinc alloy and a zinc-aluminum alloy.

19. The push-pull cable as in claim 18, wherein at least an inner cylindrical surface of the outer cable that defines the hollow interior at least substantially comprises polyethylene and the outer diameter is between 0.1 and 0.5 millimeters less than the inner diameter.

20. The push-pull cable as in claim 19, wherein the thickness of the outer sheath is between 10 and 30 microns, the second metallic composition comprises steel and silicone grease is disposed in the clearance.

21. A push-pull cable comprising:
    an outer cable defining a cylindrical hollow interior with a circular inner surface having an inner diameter, and
    a cylindrical inner cable slidably disposed within the hollow interior, the cylindrical inner cable consisting of an annular outer sheath consisting of a first metallic composition that surrounds and directly contacts an entire outer circumferential surface of a cylindrical wire core consisting of a second metallic composition, the annular outer sheath having a thickness of between 3 and 35 microns,
    wherein the annular outer sheath defines a circular outer circumferential surface of the inner cable, the circular outer circumferential surface having an outer diameter that is between 0.05 and 0.5 millimeters less than the inner diameter such that a clearance is defined between the circular outer circumferential surface of the inner cable and the circular inner circumferential surface of the outer cable, no other wire or solid structure intervenes between the circular outer circumferential surface of the inner cable and the circular inner circumferential surface of the outer cable, and the circular inner surface is contactable by all portions of the circular outer circumferential surface of the inner cable.

22. The push-pull cable as in claim 21, wherein the outer diameter is between 1.15 and 1.25 millimeters and the inner diameter is between 1.30 and 1.65 millimeters.

23. The push-pull cable as in claim 22, wherein:

the first metallic composition comprises one of zinc, a zinc alloy and a zinc-aluminum alloy, at least the circular inner surface of the outer cable at least substantially comprises polyethylene, the outer diameter is between 0.1 and 0.5 millimeters less than the inner diameter, the thickness of the outer sheath is between 10 and 30 microns, the second metallic composition comprises steel and silicone grease is disposed in the clearance.

* * * * *